United States Patent [19]
Sirkin

[11] Patent Number: 5,059,048
[45] Date of Patent: Oct. 22, 1991

[54] KEYBOARD FOR USE WITH ONE HAND HAVING CURVILINEAR AND LINEAR ROWS OF KEYS

[76] Inventor: Mark J. Sirkin, 362 Clinton St., Apt. 3, Brooklyn, N.Y. 11231

[21] Appl. No.: 422,590

[22] Filed: Oct. 17, 1989

[51] Int. Cl.⁵ ............................................. B41J 5/10
[52] U.S. Cl. ................................... 400/486; 400/489
[58] Field of Search .......................... 400/485–487, 400/484, 488, 489

[56] References Cited

U.S. PATENT DOCUMENTS

| | | | |
|---|---|---|---|
| 3,920,979 | 11/1975 | Kilby et al. | 400/486 X |
| 3,929,216 | 12/1975 | Einbinder | 400/486 X |
| 3,944,042 | 3/1976 | Gremillet | 400/486 X |
| 3,967,273 | 6/1976 | Knowlton | 400/486 X |
| 3,976,840 | 8/1976 | Cleveland et al. | 400/486 X |
| 4,615,629 | 10/1986 | Power | 400/486 |
| 4,846,598 | 7/1989 | Livits | 400/485 X |
| 4,940,346 | 7/1990 | Liljenquist | 400/486 X |

*Primary Examiner*—Clifford D. Crowder
*Assistant Examiner*—John S. Hilten
*Attorney, Agent, or Firm*—Howard J. Greenwald

[57] ABSTRACT

A keyboard permitting data entry with only one hand in which the keys are arranged in non-alphabetic order. The keyboard contains at least four vertical columns of keys, at least six horizontal rows of keys, at least 26 data entry keys, at least 11 multiple entry keys, and at least 3 command keys.

14 Claims, 4 Drawing Sheets

KEYBOARD FOR USE WITH ONE HAND HAVING CURVILINEAR AND LINEAR ROWS OF KEYS

FIELD OF THE INVENTION

A keyboard permitting data entry with only one hand which contains at least four vertical columns of keys and at least six horizontal rows of keys.

BACKGROUND OF THE INVENTION

Input keyboards are well known to those skilled in the art. Thus, U.S. Pat. No. 4,615,629 of Daniel Power describes a keyboard which allows entry by a user with only one hand. At column 1 of this patent, it is disclosed that "Alphabetical keyboard arrangements . . . can potentially facilitate the use of keyboards by non-typists, but the obvious alphabeticval arrangement of the letter keys . . . has been found to be almost as difficult to use and learn as the QWERTY design. In this regard, it appears this obvious alphabetic design neglects important facts as to how humans process information . . . ."

The Power patent also discusses prior art U.S. Pat. No. 4,180,337 of Otey et al. and notes that, with regard to the Otey keyboard, ". . . placing six keys in a row requires awkward lateral-hand movements and encourages people to use four or five digits of the hand, resulting in weak and awkward thumb and fourth finger movements."

Despite the stated disadvantages of the alphabetic keyboard, Power discloses and claims an alphabetic keyboard. Although his keyboard arguably is better than the keyboards of the prior art, it still suffers from many disadvantages. The Power keyboard, with its many keys and the manner in which they are arranged, places excessive demands upon the user to learn and operate the keyboard. Furthermore, the use of the alphabetic arrangement is still ". . . almost as difficult to use and learn as the QWERTY design."

It is an object of this invention to provide a keyboard which can easily be learned and used by a typist.

It is another object of this invention to provide a keyboard which can be operated by a typist with only one hand.

SUMMARY OF THE INVENTION

In accordance with this invention, there is provided a keyboard permitting data input with only one hand in which the keys are arranged in non-alphabetic order. This keyboard contains at least four vertical columns of keys, at least six horizontal rows of keys, at least 26 data entry keys, at least 11 different multiple-function keys, and at least 3 command keys.

BRIEF DESCRIPTION OF THE DRAWINGS

The present invention will be more fully understood by reference to the following detailed description thereof, when read in conjunction with the attached drawings, wherein like reference numerals refer to like elements and wherein.

DESCRIPTION OF THE PREFERRED EMBODIMENTS

Figure 1:
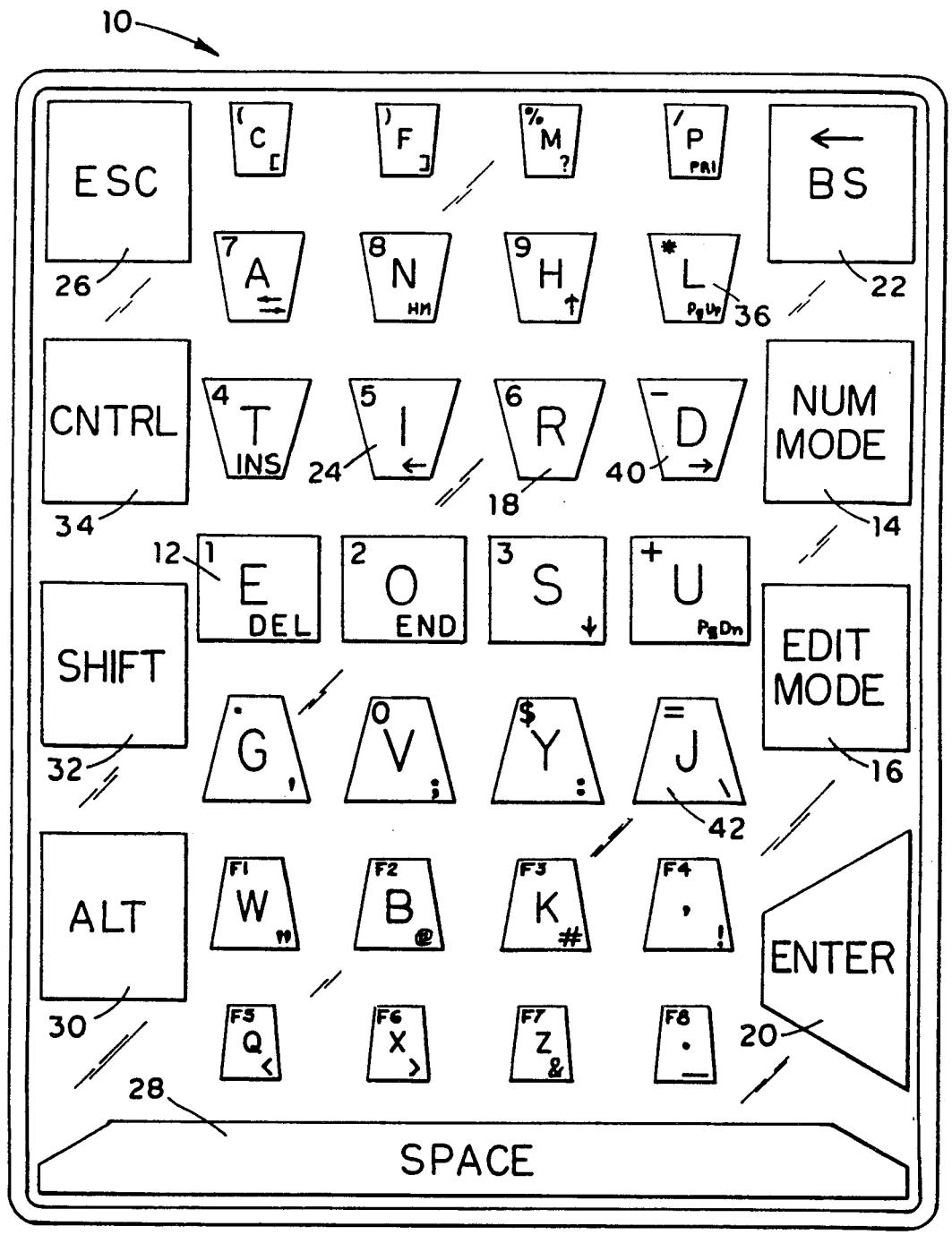
FIG. 1 is a top view of one preferred embodiment of applicant's invention.
Figure 2:
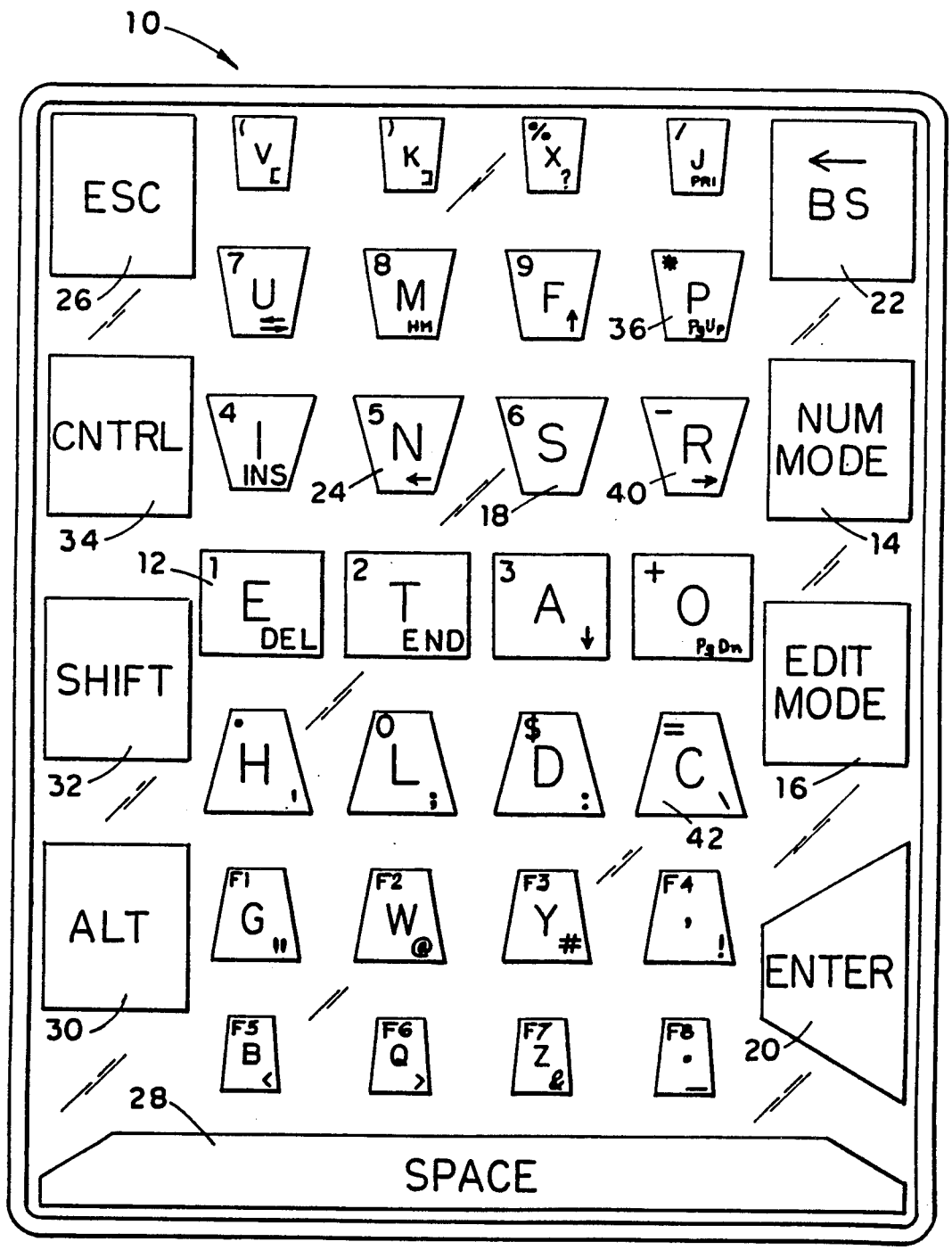
FIG. 2 is a top view of another preferred embodiment of applicant's invention.
Figure 3:
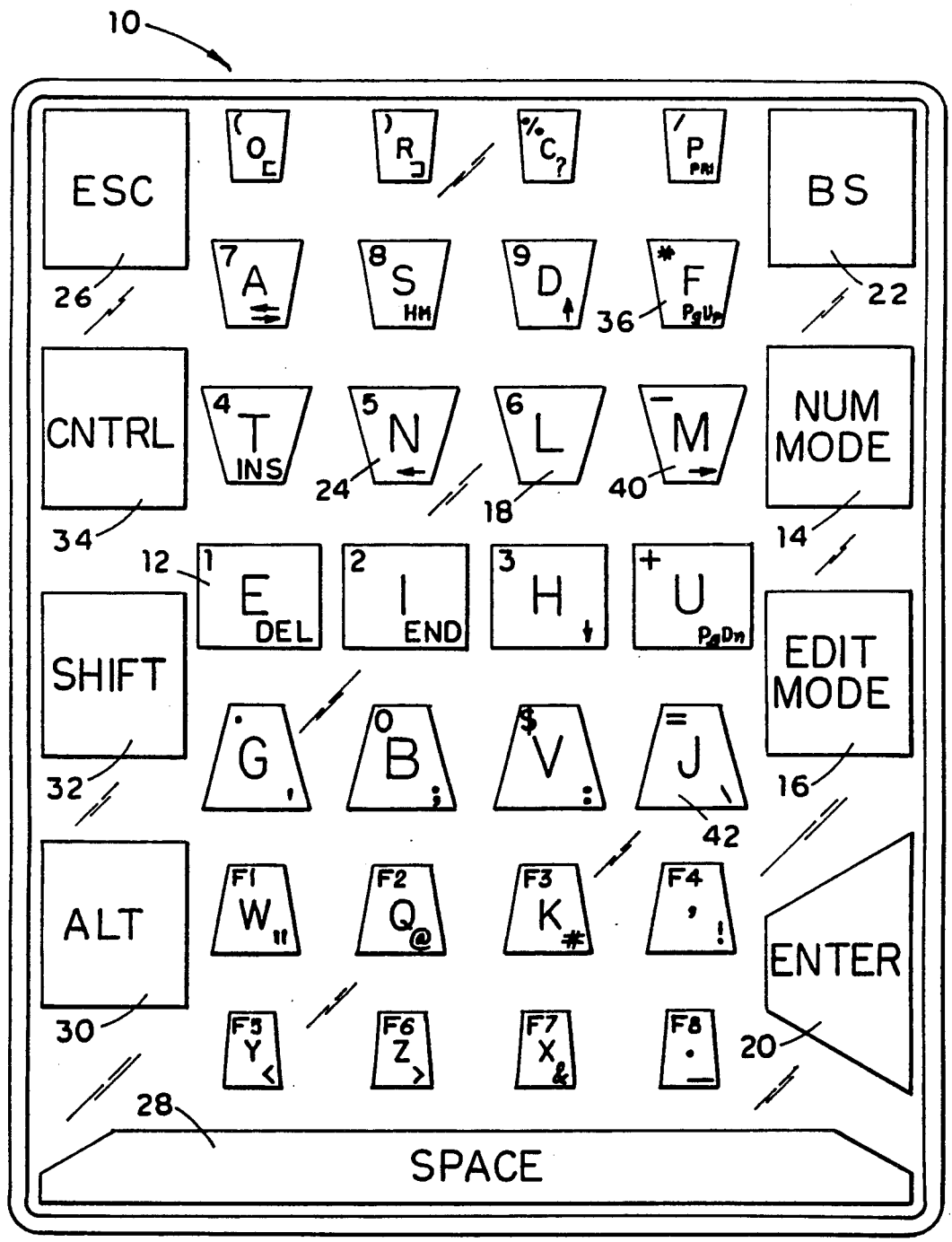
FIG. 3 is a top view of yet another preferred embodiment of applicant's invention.
Figure 4:
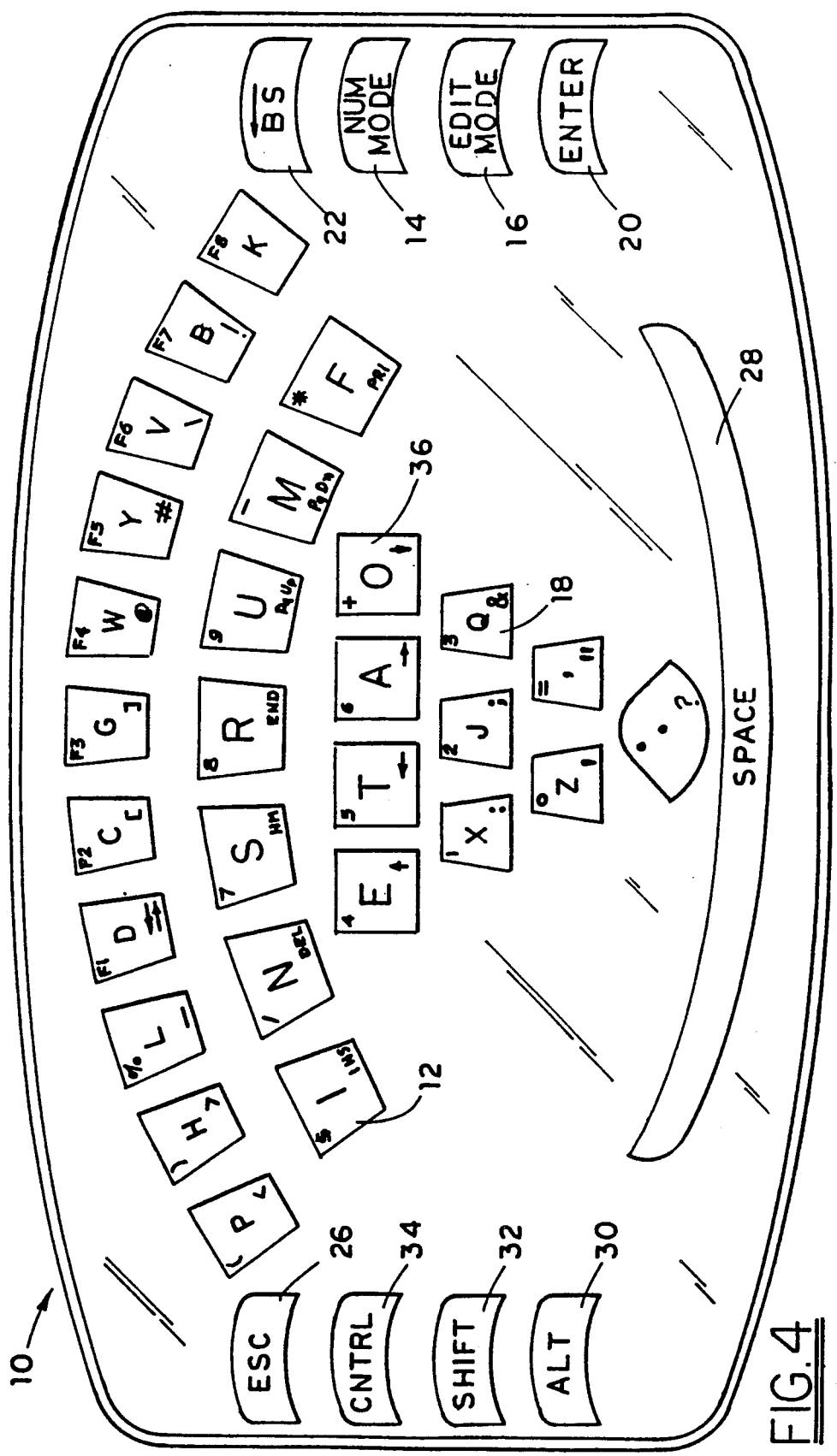
FIG. 4 is a top view of yet another preferred embodiment of applicant's invention.

A preferred embodiment of this invention is illustrated in FIG. 1. This embodiment, and the embodiments illustrated in FIGS. 2, 3, and 4, are designed for the single-handed input of linguistic and mathematical data and the manipulation thereof. In these embodiments, keys are arranged to facilitate ease of learning, rapid typing, and the minimization of typing of errors; and rapid typing is facilitated by a unique arrangement of keys in which the most frequently typed letters and letter combinations are placed close together and are easily accessible by the two strongest fingers.

The apparatus of this invention enables one-handed use. As used in this specification, the term one-handed use refers to ability of the device to allow a user to perform all necessary data entry functions with only one hand.

The keyboard of this invention comprises at least about 26 data entry keys suitable for inputting at least one kind of alphanumeric information. Unlike the keyboard of U.S. Pat. No. 4,615,629, however, the keys of the keyboard of this invention are arranged in non-alphabetic order. The term non-alphabetic, as used in this specifiction, refers to an arrangment of keys which is not in the customary order of the letters of the alphabet.

The keyboard of this invention is comprised of at least about 26 data input keys. It is preferred that the keyboard contain at least about 28 data input keys.

The term data input key, as used in this specification, refers to a key whose activation encodes information. Thus, as is apparent to those skilled in the art, data input keys include letter keys, number keys, punctuation keys, and the like.

Referring to FIG. 1, it will be seen that the preferred keyboard 10 depicted therein is comprised of a multiplicity of data input keys, each of which may have several functions. Thus, e.g., key 12 can input the numeral 1, the letter E, or the delete function. The letter E is entered by the key when the keyboard 10 is in its default mode by pressing key 12. Keyboard 10 may be put into the numeric mode by depressing numeric mode key 14; when the keyboard is in this numeric mode, depressing key 12 will enter the numeral 1. Keyboard 10 also may be put into the edit mode by depressing edit mode key 16; when the keyboard is in this edit mode, depressing key 12 will enter the delete function, which will then delete previously input information.

The keyboard 10 of this invention is comprised of at least about 11 multiple function data entry keys. As used in this specification, the term multiple function data entry key refers to a key which is capable of inputting at least two different types of alphanumeric information selected from the group consisting of letters, numbers, and punctuation symbols. Thus, referring to FIG. 1, key 12 can input the number 1 and the letter E, in different modes, and thus is a multiple function data entry key. Thus, e.g., key 18 can input the number 6 and the letter R and also is a multiple function data entry key. Thus, for example, a key (not shown) which could input two different letters (such as A and Z) and/or two different numbers (such as 3 and 7) is a multiple function data entry key; each of the different letters is a different kind of alphanumeric information, as is each of the different numbers.

It is preferred that keyboard 10 comprise at least 20 of said multiple function data entry keys. In a more preferred embodiment, the keyboard 10 comprises at least about 26 multiple data entry keys.

The keyboard of this invention is comprised of at least about 26 data entry keys. As used in this specification, the term data entry key refers to any key which can input at least one kind of alphanumeric information. It is preferred that keyboard 10 comprise at least about 28 data entry keys.

In addition to data entry keys, keyboard 10 is also comprised of of at least three command keys. The term command key refers to a single-purpose key whose depression activates a function which does not involve the direct input of alphanumeric data. Thus, referring to FIG. 1, the depression of ENTER key will enter information previously input into a main memory or storage area. Thus, the depression of NUM MODE key 14 will put keyboard 10 into the numeric mode so that, whenever any of the data entry keys is depressed, the character appearing in the upper left hand corner of the key will be entered. Thus, the depression of EDIT MODE key 16 will put keyboard 10 into the text editing mode so that, when any data entry key is depressed, the character or function in the lower right hand side of the key will be input. Thus, the depression of BS key 22 causes backspacing (it should be noted that backspacing also can be effected in the embodiment illustrated in FIG. 1 by key number 24 [in the edit model]).

In one preferred embodiment, keyboard 10 contains at least about 5 of said command keys. In yet an even more preferred embodiment, keyboard 10 contains at least 9 of said command keys. Thus, for example, in addition to the command keys previously described, one may use keys activating conventional computer and/or typewriting commands such as ESC (see key 26), SPACE (see key 28), ALT (see key 30), SHIFT (see key 32), CNTRL (see key 34), and the like. These conventional computer and/or typewriting commands are well known to those skilled in the art and are described in, e.g., Volumes 18 (pages 809-810) and 4 (pages 1045-1058), "The New Encyclopaedia Britanica" (Encyclopaedia Britanica Company, Chicago, Ill., 1980), the disclosure of which is hereby incorporated by reference into this specification.

The data entry keys of keyboard 10 are comprised of keys of at least four different shapes. As used in this specification, the term different shape refers to a key which has a different size and/or shape and/or orientation than another key. Thus, for example, key 36 has a different shape than key 18; although they are both trapezoidal, they are of different sizes. Thus, e.g., key 24 has a different shape than key 12; although they both have substantially the same height, one is trapezoidal and the other is square. Thus, e.g., key 40 has a different shape than key 42; although they are both trapezoidal and of the same size, they have different orientations.

The keyboard 10 of this invention has an arrangement of keys which facilitates ease of learning, rapid typing, and fewer input errors. The data entry keys of keyboard 10 are preferably arranged in rows and columns, and the most commonly used keys are clustered near each other.

A substantial amount of research has been conducted regarding which characters or combinations of characters are most commonly used in the English language. Thus, e.g., U.S. Pat. No. 1,342,244 of Wolcott discloses that the characters Y, N, I, U, A, T, F, C, L, S, R, M, E, O, D, and H account for about 90.66 percent of the total characters ordinarily used in the English language. Thus, e.g., U.S. Pat. No. 2,232,684 of Poirot discloses that, for English, German, French, and Spanish, substantially the same selection of characters described by Wolcott has similar frequencies of occurrence. Thus, e.g., a similar selection of characters is discussed in H.C.A. van Tilborg's "An Introduction to Cryptology," (Kluwer Academic Publishers, Boston, Mass., 1988). The disclosure of each of these references is hereby incorporated by reference into this specification.

In the preferred embodiments described in the Figures, which illustrate keyboards suitable for the English language, the most common characters are grouped either in rows or columns. These English language characters, in declining order of frequency, are: E, N, I, T, R, A, O, S, D, H, L, C, U, M, G, Y, F, P, V, W, K, B, X, Z, Q, J.

In the default mode of keyboard 10, when neither the EDIT MODE (key 16) or the NUM MODE (key 14) are in the "on" position, each of the data entry keys will preferably type a lower-case or upper-case letter (which choice is controlled by SHIFT key 32), a comma, a period, etc. It is preferred that at least about 90 percent of the data entry keys which are within two rows of the center of keyboard 10 type at least one of the 16 most common characters in the languge when the keyboard is in the default mode.

The keyboard of this invention is comprised of at least about four vertical columns of keys and at least about six horizontal rows of keys. In one preferred embodiment, the keyboard contains from about 4 to about 7 columns and from about 5 to about 12 rows.

The term column, as used in this specification, refers to a substantially vertical arrangement of at least two keys. Thus, referring to FIG. 1, the keys for characters C, A, T, E, G, W, and Q define a substantially linear and vertical column. Thus, referring to FIG. 4, the keys P, I define a substantially linear and vertical column; the term linear, as used in this specfication, includes any arrangement of two or more adjacent keys which lie substantially in a straight line. By way of illustration, referring again to FIG. 4, the horizontal row defined by the keys P, H, L, D, C, G, W, Y, V, B, and K is linear within the meaning of this specification.

As indicated above, the horizontal rows of the keyboard of this invention comprise two or more adjacent keys each lying next to each other in a substantially horizontal plane. Thus, by way of further illustration, both the arrangements of characters E, O, S, U (of FIG. 1) and I, N, S, R, U, M, F (of FIG. 4) both define horizontal rows.

Referring to FIG. 2, another preferred embodiment of applicant's invention is illustrated. This horizontally-oriented embodiment has the most frequently used letters arranged near the center of the keyboard such that these frequently used letters are horizontally adjacent.

FIG. 3 illustrates another embodiment of applicant's invention. This vertically-oriented embodiment has the most frequently used letters arranged near the center of the keyboard such that these frequently used letters are vertically adjacent and in the top half of the keyboard.

FIG. 4 illustrates another preferred embodiment in which the rows have keys arranged in a substantially curvilinear fashion and with unequal numbers of keys in the rows and columns. This curvilinear arrangement of keys is within the scope of applicant's invention.

It is to be understood that the aforementioned description is illustrative only and that changes can be made in the apparatus, the arrangement of its component parts, the ingredients and their proportions, and in the sequence of combinations and process steps as well as in other aspects of the invention discussed herein without departing from the scope of the invention as defined in the following claims.

I claim:

1. A keyboard allowing data input with only one hand, wherein said keyboard is comprised of at least five rows of keys, and wherein:
   (A) said keyboard is comprised of at least about 26 data entry keys suitable for inputting at least one kind of alphanumeric information, wherein:
      a. said data entry keys comprise keys of at least three different shapes,
      b. each of said rows of keys consists of data entry keys of the same shape, and
      c. said data entry keys are arranged in non-alphabetic order;
   (B) said keyboard is comprised of at least 11 multiple-function data entry keys suitable for inputting at least two kinds of alphanumeric information,
   (C) said keyboard is comprised of at least 3 command keys,
   (D) said keyboard is comprised of an upper section and a lower section, wherein:
      a. said upper section is comprised of a top, curvilinear row of keys, and a second, curvilinear row of keys,
      b. said top, curvilinear row is comprised of more keys than said second, curvilinear row,
      c. said lower section is comprised of a top, substantially linear row of keys, a second, substantially linear row of keys, and a third, substantially linear row of keys,
      d. said top, substantially linear row is comprised of more keys than said second, substantially linear row,
      e. said second, substantially linear row is comprised of more keys than said third substantially linear row, and
      f. said second, curvilinear row is comprised of more keys than said top, substantially linear row, and
   (E) said lower section is comprised of a bottom row which consists of one key.

2. The keyboard as recited in claim 1, wherein said keyboard comprises at least about 28 of said data entry keys.

3. The keyboard as recited in claim 1, wherein said keyboard is comprised of at least about 20 of said multiple-function data entry keys.

4. The keyboard as recited in claim 1, wherein said keyboard comprises at least about 5 of said command keys.

5. The keyboard as recited in claim 4, wherein said keyboard is comprised of at least about 26 of said multiple function data entry keys.

6. The keyboard as recited in claim 1, wherein said keyboard is comprised of a key in the shape of an elongated ellipse.

7. The keyboard as recited in claim 6, wherein said top, curvilinear row consists of 11 keys.

8. The keyboard as recited in claim 7, wherein said second curvilinear row consists of 7 keys.

9. The keyboard as recited in claim 8, wherein said top, substantially linear row consists of 4 keys.

10. The keyboard as recited in claim 9, wherein said second, substantially linear row consists of 3 keys.

11. The keyboard as recited in claim 10, wherein said third, substantially linear row consists of 2 keys.

12. The keyboard as recited in claim 11, wherein each of the keys in said top curvilinear row and said second curvilinear row has a trapezoidal cross-sectional shape.

13. The keyboard as recited in claim 12, wherein each of the keys in said top, substantially linear row has a square cross-sectional shape.

14. The keyboard as recited in claim 13, wherein each of the keys in said second, substantially linear row and said third, substantially linear row have an inverted-trapezoidal cross-sectional shape.

* * * * *